(12) United States Patent
Kwon

(10) Patent No.: US 12,297,876 B2
(45) Date of Patent: May 13, 2025

(54) IMPACT-RESISTANT MULTI-ANGLE BUNDLE PAWL BACKSTOP RATCHET RING

(71) Applicants: DAEWON ELECTRIC CO., LTD., Cheongju-si (KR); DAEWON INDUSTRY COMPANY, Jeungpyeong-gun Chungcheongbuk-do (KR)

(72) Inventor: Sae Won Kwon, Jeungpyeong-gun Chungcheongbuk-do (KR)

(73) Assignees: DAEWON ELECTRIC CO., LTD., Cheongju-si (KR); DAEWON INDUSTRY COMPANY, Chungcheongbuk-do (KR)

( * ) Notice: Subject to any disclaimer, the term of this patent is extended or adjusted under 35 U.S.C. 154(b) by 0 days.

(21) Appl. No.: 18/711,614

(22) PCT Filed: Oct. 20, 2022

(86) PCT No.: PCT/KR2022/016059
§ 371 (c)(1),
(2) Date: May 20, 2024

(87) PCT Pub. No.: WO2023/106618
PCT Pub. Date: Jun. 15, 2023

(65) Prior Publication Data
US 2025/0012330 A1 Jan. 9, 2025

(30) Foreign Application Priority Data
Dec. 9, 2021 (KR) .................. 10-2021-0175368

(51) Int. Cl.
*F16D 41/18* (2006.01)
(52) U.S. Cl.
CPC ................. *F16D 41/18* (2013.01)

(58) Field of Classification Search
CPC .......... F16D 41/06; F16D 41/12; F16D 41/18
See application file for complete search history.

(56) References Cited

U.S. PATENT DOCUMENTS

| 4,058,192 A * | 11/1977 | Haigh ............... F16D 41/18 192/46 |
| 2017/0326711 A1 * | 11/2017 | Hu ................. B25B 13/465 |
| 2023/0106820 A1 * | 4/2023 | Melkovitz ........ B25B 13/463 81/60 |

FOREIGN PATENT DOCUMENTS

| JP | 2004-268843 A | 9/2004 |
| JP | 2007-303513 A | 11/2007 |

(Continued)

*Primary Examiner* — Lori Wu
(74) *Attorney, Agent, or Firm* — NKL LAW; Jae Youn Kim

(57) ABSTRACT

The present invention relates to a ratchet ring capable of transmitting one-way power and, more specifically, to an impact-resistant multi-angle bundle pawl backstop ratchet ring formed so that an outer-wheel sawteeth portion is formed in the inner circumference of an outer wheel and plural sets of multi-angle bundle pawls engaged with the outer-wheel sawteeth portion are formed on the circumference of an inner wheel, and thus, a structural simplification and precise operation can be achieved and durability against a strong impact load can be obtained. Also, by enabling the segmented engagement within one-pitch section of the outer-wheel sawteeth portion so that the multi-angle bundle pawl in each set can be engaged with the outer-wheel sawteeth portion at sequential locations at different angles, a sawteeth void due to the sequential engagement structure can be reduced so as to minimize an error and to prevent a backlash effect.

4 Claims, 8 Drawing Sheets

(56) References Cited

FOREIGN PATENT DOCUMENTS

| JP | 2011-102112 | A | 5/2011 |
|----|----|----|----|
| KR | 10-0405296 | B1 | 11/2003 |
| KR | 10-1415580 | B1 | 7/2014 |
| KR | 10-2018-0000029 | A | 1/2018 |
| KR | 20-0491252 | Y1 | 3/2020 |

\* cited by examiner

IMPACT-RESISTANT MULTI-ANGLE BUNDLE PAWL BACKSTOP RATCHET RING

TECHNICAL FIELD

The present invention relates to a ratchet ring capable of transmitting power in one direction, and more particularly to an impact-resistant multi-angle bundle pawl backstop ratchet ring configured to simplify a structural configuration thereof, to prevent backlash occurrence so as to perform precise operation, and to improve durability to withstand strong impact loads.

BACKGROUND ART

In general, a ratchet and a cam clutch are representative devices configured to transmit rotation in one direction and not to transmit motion in the opposite direction. The ratchet or the cam clutch is applied to various fields such as a ratchet wrench, a rope fixing ratchet, and an inclined conveyor.

Here, the ratchet includes gears or teeth so as to perform rotation in one direction by a locking operation of a spring-operated pawl or a releasing operation thereof.

Additionally, in the case of the cam clutch, bearing balls and anti-reverse cams are provided between an inner ring and an outer ring, thereby making it possible to perform rotation in one direction. Here, when rotation in the opposite direction is performed, each of the cams serves as a wedge configured to prevent rotation in the opposite direction.

However, in the process of stopping or operating the above-described ratchet or the cam clutch, backlash occurs and, as such, the ratchet or the cam clutch is pushed back during driving thereof due to a gap between the parts. When strong impact or overload occurs during reoperation of the ratchet or the cam clutch, there is a serious problem in that precise rotational power is not transmitted due to damage to the ratchet or the cam clutch. When the ratchet or the cam clutch is used for a long period of time, a single pawl, a bearing ball, or an anti-reverse cam wears out, which results in severe backlash and deterioration in durability.

RELATED ART DOCUMENT

Patent Document (Patent Document 1) Korean Utility Model Registration No. 20-0491252
(Patent Document 2) Korean Patent No. 10-0405296
(Patent Document 3) Korean Patent No. 10-1415580

DISCLOSURE

Technical Problem

Therefore, the present invention has been made in view of the above problems, and it is an object of the present invention to provide an impact-resistant multi-angle bundle pawl backstop ratchet ring including an outer ring and an inner ring, wherein the outer ring has outer ring saw teeth formed on the inner peripheral surface thereof, and the inner ring has plural groups of multi-angle bundle pawls formed on the circumference thereof and engaged with the outer ring saw teeth, thereby making it possible to simplify a structural configuration, to provide precise operation, and to improve durability to withstand strong impact loads.

Additionally, the impact-resistant multi-angle bundle pawl backstop ratchet ring is configured to provide segmented engagement at one pitch section of the outer ring saw teeth so as to enable the multi-angle bundle pawls of the respective groups to be engaged with the outer ring saw teeth at sequential positions respectively having different angles of the multi-angle bundle pawls, thereby making it possible to reduce a gap between the saw teeth by a sequential engagement structure, to minimize an error, and to prevent backlash occurrence.

Technical Solution

In accordance with the present invention, the above and other objects can be accomplished by the provision of an impact-resistant multi-angle bundle pawl backstop ratchet ring including an outer ring having an inner ring mounting hole formed to penetrate a central portion thereof, wherein the inner ring mounting hole has outer ring saw teeth formed on an inner peripheral surface thereof, wherein the outer ring saw teeth have straight portions and inclined portions continuously formed in a circumferential direction, a circular ring-shaped inner ring having a shaft hole formed to penetrate a central portion thereof, wherein the inner ring is mounted in the inner ring mounting hole of the outer ring and has a plurality of bundle pawl mounting grooves formed on a circumference thereof and disposed at regular intervals, and a multi-angle bundle pawl unit having springs each installed in a corresponding one of the bundle pawl mounting grooves, wherein the multi-angle bundle pawl unit is operated to protrude by the springs and is engaged with the outer ring saw teeth of the outer ring so as to provide rotational force in one direction, wherein the multi-angle bundle pawl unit 300 is formed of plural groups of first, second, and third multi-angle bundle pawls, the respective first, second, and third multi-angle bundle pawls are configured to be engaged with the outer ring saw teeth of the outer ring at sequential positions respectively having different angles, the outer ring saw teeth of the outer ring are formed to protrude inwards so as to have front and rear stepped portions respectively formed at a front side and a rear side of the outer ring saw teeth, the inner ring has a seating protrusion and a finishing plate support portion, wherein the seating protrusion is formed on a rear circumference of the inner ring and is seated on the rear stepped portion of the outer ring, and the finishing plate support portion is formed to protrude from a front side of the inner ring so as to extend from the shaft hole, and the finishing plate support portion formed on the front side of the inner ring penetrates a finishing plate having a through hole formed therein, wherein the finishing plate is seated on and coupled to the front stepped portion so as to constrain the outer ring.

The first, second, and third multi-angle bundle pawls may be configured to form three groups, each of the three groups may be formed of a corresponding one of first, second, and third engagement tools, wherein each of the radially arranged four first engagement tools, four second engagement tools, and four third engagement tools may form one group, each of the first, second, and third engagement tools may have a corresponding one of the springs respectively installed in the bundle pawl mounting grooves so as to have protruding force, wherein the first, second, and third engagement tools may be positioned to intersect each other, and the first, second, and third engagement tools may have engagement tool saw teeth respectively formed at tip portions thereof, wherein each of the engagement tool saw teeth may have straight portions and inclined portions formed to be engaged with the outer ring saw teeth of the outer ring, and when the inner ring is rotated in one direction, the engagement tool saw teeth of the first, second, and third multi-angle bundle pawls may not interfere with the outer ring saw teeth, thereby enabling idling of the inner ring, and when the inner ring is rotated in the other direction, the engagement tool saw teeth of the first, second, and third multi-angle bundle pawls may be sequentially engaged with the outer ring saw teeth, thereby enabling the outer ring and the inner ring to rotate together.

Advantageous Effects

According to the present invention, an impact-resistant multi-angle bundle pawl backstop ratchet ring includes an outer ring and an inner ring, wherein the outer ring has outer ring saw teeth formed on the inner peripheral surface thereof, and the inner ring has plural groups of multi-angle bundle pawls formed around the circumference thereof, engaged with the outer ring saw teeth, and configured to protrude outwards by spring elasticity, thereby having an effect of simplifying a structural configuration and enabling stable installation and operation of the multi-angle bundle pawls.

Furthermore, the saw teeth of the multi-angle bundle pawls of the respective groups are configured to be engaged with the outer ring saw teeth of the outer ring at sequential positions respectively having different angles, thereby having an effect of maximally reducing a gap between the saw teeth so as to maximally prevent backlash occurrence during driving. In this manner, there are effects of preventing driving shock, further improving durability to withstand strong impact loads, and performing precise driving.

[Description of Reference Numerals]

Figure 1:
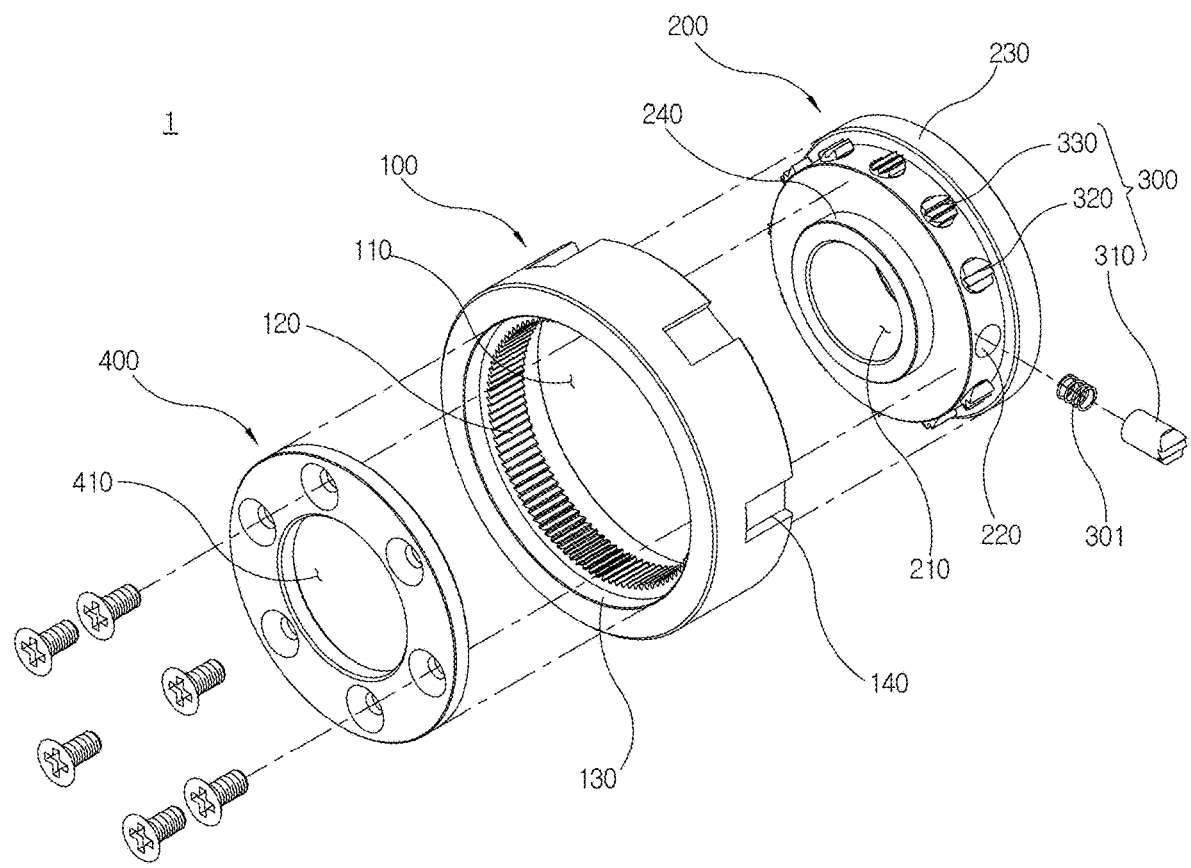
FIG. 1 is an exploded perspective view of an impact-resistant multi-angle bundle pawl backstop ratchet ring of the present invention.

| | |
|---|---|
| 100: Outer ring | 110: Inner ring mounting hole |
| 120: Outer ring saw teeth | 130, 130': Front and rear stepped portions |
| 140: Stopping groove | |
| 200: Inner ring | 210: Shaft hole |
| 220: Bundle pawl mounting groove | 230: Seating protrusion |
| 240: Finishing plate support portion | 250: Gear portion |
| 300: Multi-angle bundle pawl unit | 301: Spring |
| 310: First multi-angle bundle pawl | 311: First engagement tool |
| 312: Engagement tool saw teeth | 320: Second multi-angle bundle pawl |
| 321: Second engagement tool | 322: Engagement tool saw teeth |
| 330: Third multi-angle bundle pawl | 331: Third engagement tool |
| 332: Engagement tool saw teeth | |
| 400: Finishing plate | 410: Through hole |

BEST MODE

Terms or words used in the description and claims should not be restrictively interpreted as having ordinary or dictionary meanings, but should be interpreted as having meanings and concepts conforming to the inventive concept on the basis of a principle that an inventor may properly define the concept of a term to explain his or her own invention in the best way.

Therefore, embodiments described in this specification and configurations shown in the drawings are only preferred embodiments of the present invention and do not represent the entire technical idea of the present invention. It should be understood that those skilled in the art will appreciate that various modifications, additions, and substitutions are possible, without departing from the scope and spirit of the invention as disclosed in the accompanying claims.

Hereinafter, preferred embodiments of the present invention will be described in detail with reference to the attached drawings.

Figure 2:
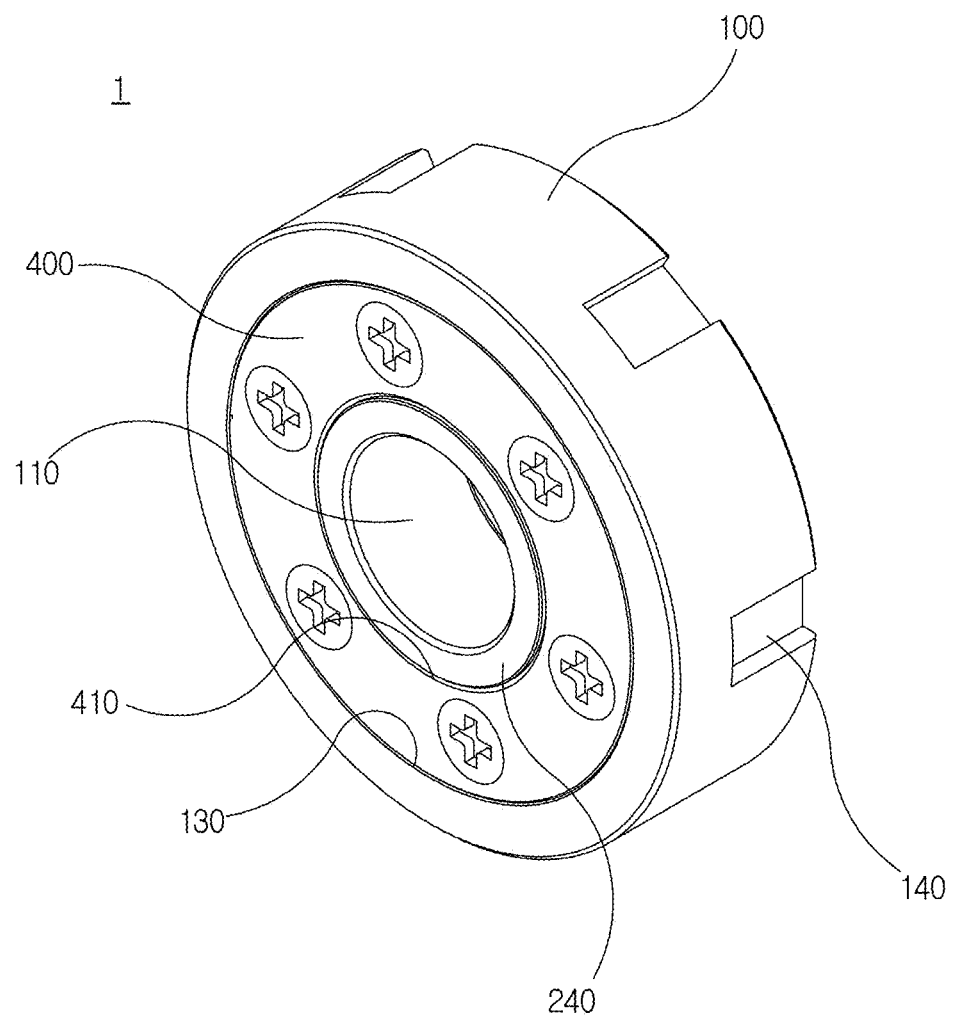
FIG. 2 is a combined perspective view of the impact-resistant multi-angle bundle pawl backstop ratchet ring of the present invention.
Figure 3:
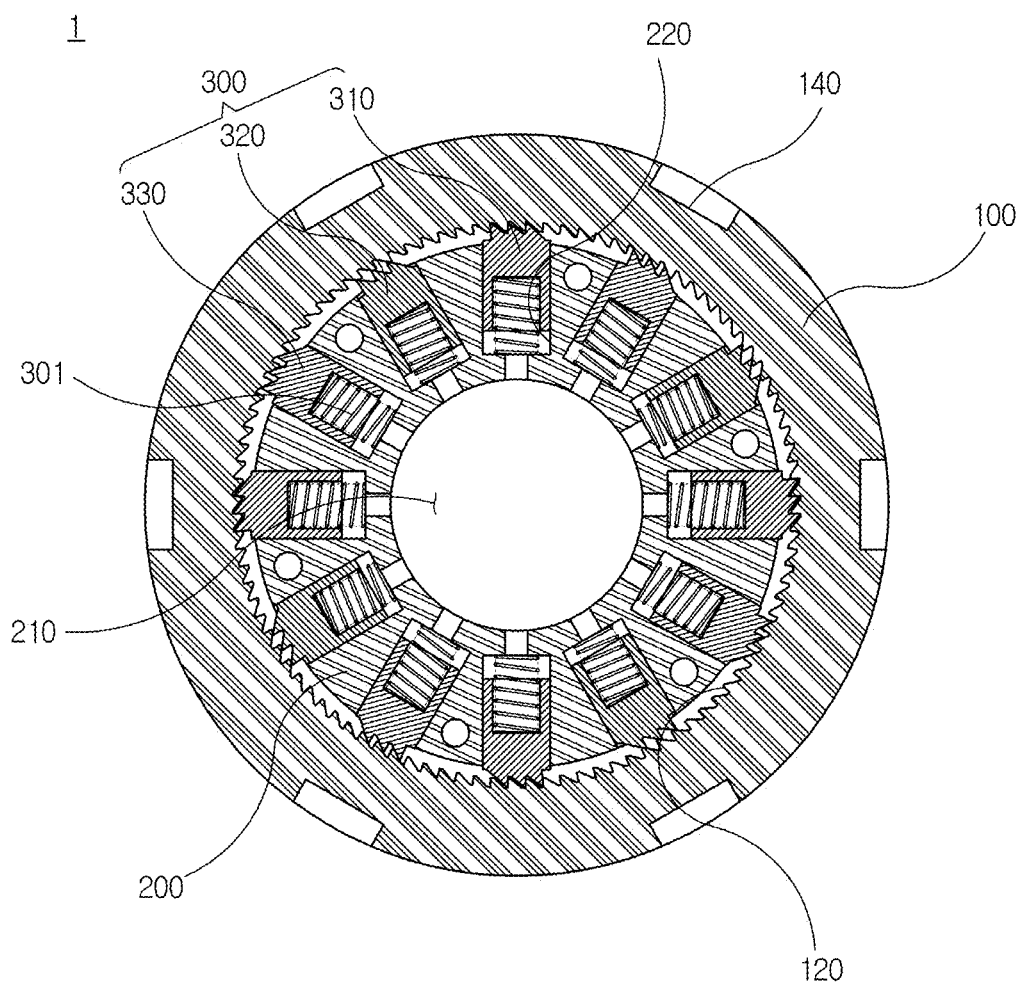
FIG. 3 is a front cross-sectional view of the impact-resistant multi-angle bundle pawl backstop ratchet ring of the present invention.
Figure 4:
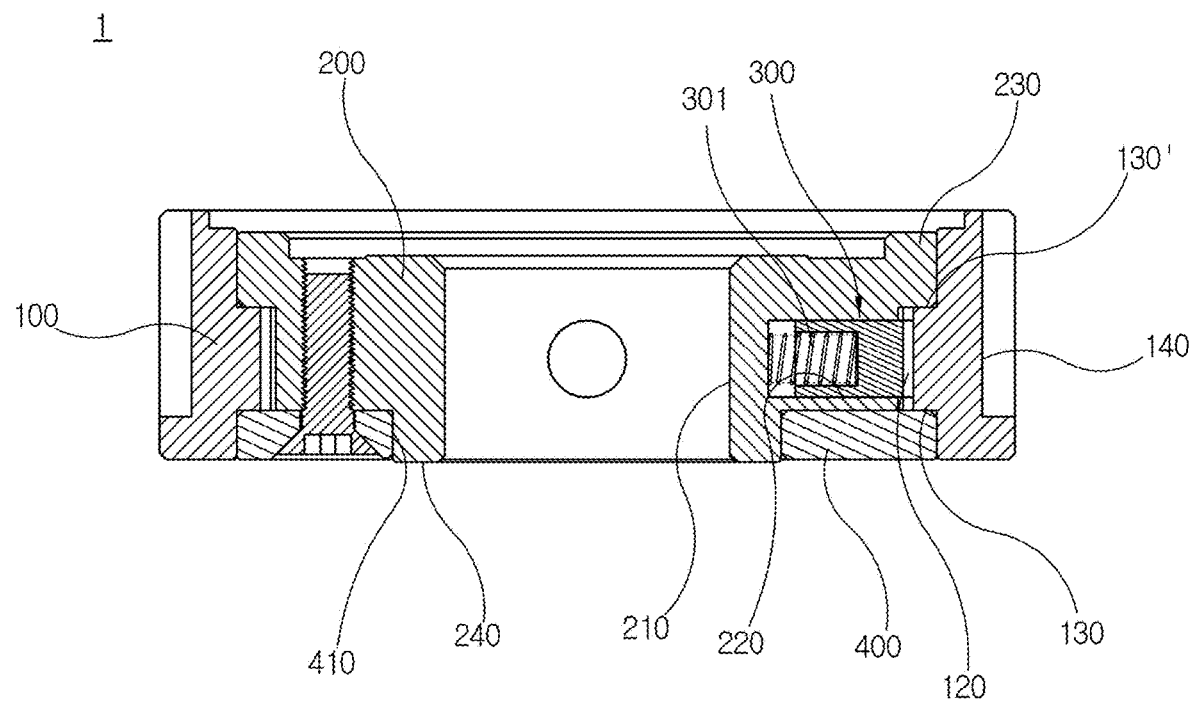
FIG. 4 is a plan cross-sectional view of the impact-resistant multi-angle bundle pawl backstop ratchet ring of the present invention.
Figure 5:
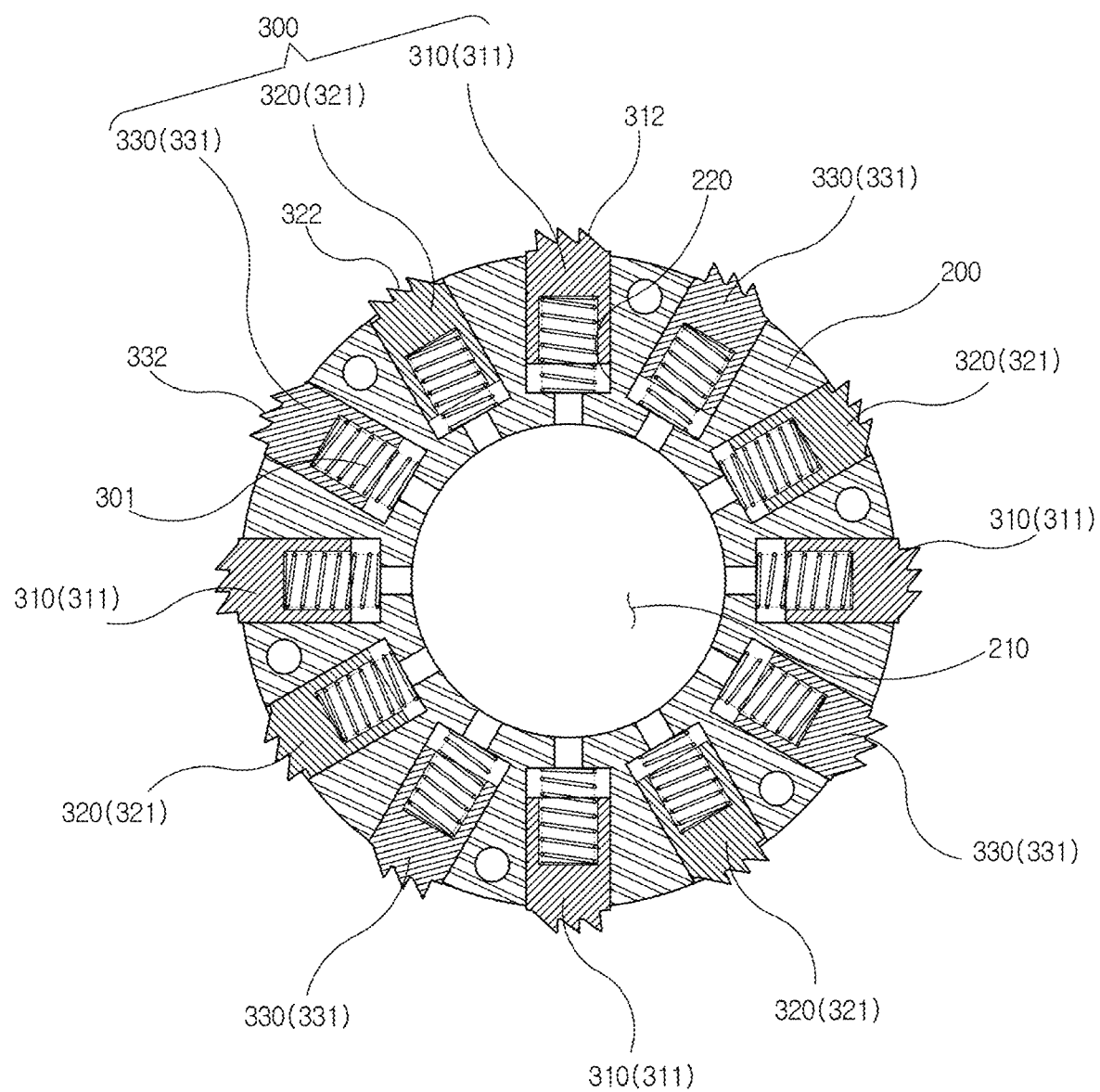
FIG. 5 is a view showing a main part of a multi-angle bundle pawl unit of the impact-resistant multi-angle bundle pawl backstop ratchet ring of the present invention.

FIG. 1 is an exploded perspective view of an impact-resistant multi-angle bundle pawl backstop ratchet ring of the present invention, FIG. 2 is a combined perspective view of the impact-resistant multi-angle bundle pawl backstop ratchet ring of the present invention, FIG. 3 is a front cross-sectional view of the impact-resistant multi-angle bundle pawl backstop ratchet ring of the present invention, FIG. 4 is a plan cross-sectional view of the impact-resistant multi-angle bundle pawl backstop ratchet ring of the present invention, and FIG. 5 is a view showing a main part of a multi-angle bundle pawl unit of the impact-resistant multi-angle bundle pawl backstop ratchet ring of the present invention.

As shown in FIGS. 1 to 5, an impact-resistant multi-angle bundle pawl backstop ratchet ring 1 of the present invention includes an outer ring 100, an inner ring 200, and a multi-angle bundle pawl unit 300.

First, in the configuration of the impact-resistant multi-angle bundle pawl backstop ratchet ring 1 of the present invention, the outer ring 100 is configured to output power to the outside. Further, the outer ring 100 has an inner ring mounting hole 110 formed to penetrate a central portion thereof and configured to allow the inner ring 200 to be described later to be mounted therein. Here, the inner ring mounting hole 110 has a circular shape.

In this case, in the present invention, the outer ring 100 is configured to have outer ring saw teeth 120 formed on the inner peripheral surface of the inner ring mounting hole 110, and the outer ring saw teeth 120 are configured to have straight portions and inclined portions that are continuously formed.

Meanwhile, in the present invention, each of the straight portions forming the outer ring saw teeth 120 is configured to be caught during power transmission, and each of the inclined portions forming the outer ring saw teeth 120 is configured to guide slipping movement during idling operation.

In addition, in the present invention, the outer ring 100 may further include a plurality of stopping grooves 140 formed on the outer circumference thereof at regular intervals and configured to allow normal stoppers (not shown in the drawing) to be respectively caught therein.

In the configuration of the impact-resistant multi-angle bundle pawl backstop ratchet ring 1 of the present invention, the inner ring 200 is configured to substantially transmit main power. Further, the inner ring 200 interferes with the outer ring 100 so as to transmit main power to the outer ring 100 or is released from the outer ring 100 so as to release the main power from the outer ring 100.

To this end, in the present invention, the inner ring 200 is configured to have a circular ring shape. Here, the inner ring 200 has a shaft hole 210 formed to pass through a central portion thereof and configured to allow a separate rotating shaft (not shown in the drawing) provided to transmit rotational power to be coupled thereto. Further, the inner ring 200 is configured to be mounted in the inner ring mounting hole 110 of the outer ring 100.

In addition, the inner ring 200 has a plurality of bundle pawl mounting grooves 220 formed on the outer circumference thereof at regular intervals in the circumferential direction and configured to enable first, second, and third multi-angle bundle pawls 310, 320, and 330 to be described later to be respectively mounted therein.

Figure 6:
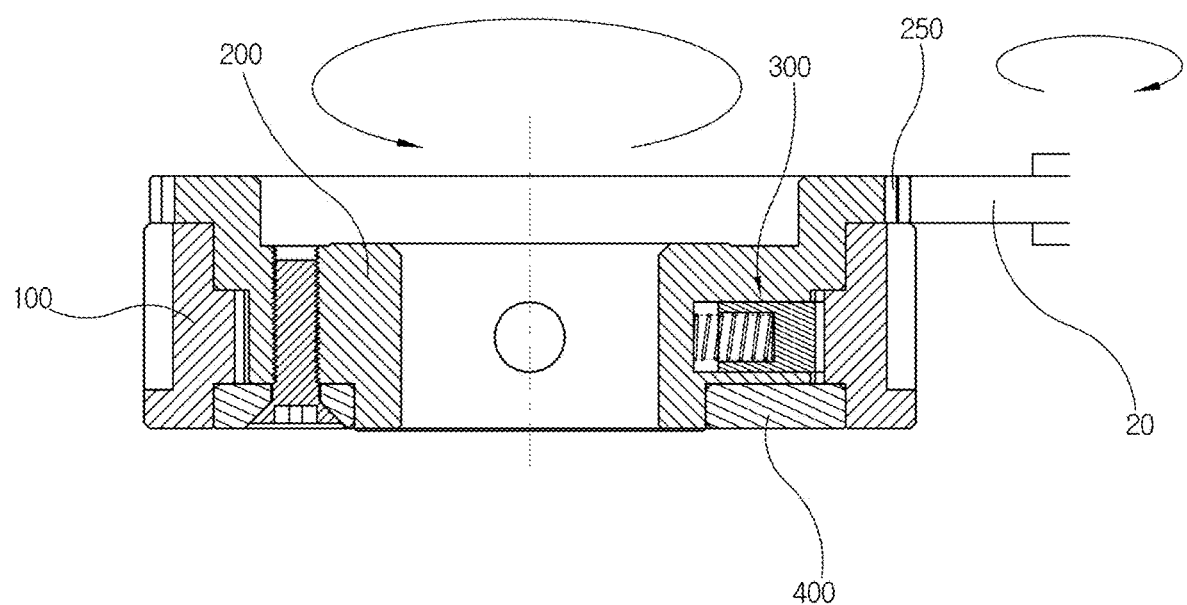
FIG. 6 is a view showing another embodiment of an inner ring of the impact-resistant multi-angle bundle pawl backstop ratchet ring of the present invention.

In addition, in the configuration of the inner ring 200 of the present invention, as another embodiment, referring to FIG. 6, the inner ring 200 may be configured to further include a gear portion 250 formed on the rear circumference thereof and configured to connect power to the inner ring 200 from the outside. Here, the gear portion 250 is different from a normal rotating shaft formed to protrude outwards in a state of covering the rear side of the outer ring 100 so as to be coupled to the shaft hole 210 of the inner ring 200.

Meanwhile, in the present invention, the outer ring 100 and the inner ring 200 are configured to enable close coupling therebetween. Further, sliding operation may be stably performed when the outer ring 100 and the inner ring 200 are coupled to each other.

To this end, first, each of the outer ring saw teeth 120 of the outer ring 100 is configured to protrude toward the inside of the inner ring mounting hole 110 by a predetermined amount. Accordingly, front and rear stepped portions 130 and 130' are respectively formed at the front side and the rear side of the outer ring saw teeth 120.

In addition, the inner ring 200 is configured to have a seating protrusion 230 formed to protrude from the rear circumference thereof and slidably seated on the rear stepped portion 130' of the outer ring 100. Further, the inner ring 200 is configured to have a finishing plate support portion 240 formed to protrude from the front side thereof so as to extend from the shaft hole 210.

Further, the front side of the inner ring 200 is configured to be finished with a finishing plate 400. Here, the circumference of the finishing plate 400 is configured to be seated on the front stepped portion 130 of the outer ring 100 and to be bolted to the inner ring 200, thereby constraining the outer ring saw teeth 120. Further, the finishing plate 400 is configured to have a through hole 410 formed in a central portion thereof and configured to allow the finishing plate support portion 240 of the inner ring 200 to pass therethrough.

In the configuration of the impact-resistant multi-angle bundle pawl backstop ratchet ring 1 of the present invention, the multi-angle bundle pawl unit 300 serves as a means to transmit power of the inner ring 200 to the outer ring 100 or release power of the inner ring 200 from the outer ring 100 in response to the outer ring saw teeth 120 of the outer ring 100. In the present invention, the multi-angle bundle pawl unit 300 is formed of a plurality of groups including the first, second, and third multi-angle bundle pawls 310, 320, and 330.

To this end, the first, second, and third multi-angle bundle pawls 310, 320, and 330 respectively have springs 301 each installed in a corresponding one of the bundle pawl mounting grooves 220, thereby allowing the first, second, and third multi-angle bundle pawls 310, 320, and 330 to protrude from the outer circumference of the inner ring 200. Further, the first, second, and third multi-angle bundle pawls 310, 320, and 330 are configured to be engaged with the outer ring saw teeth 120 of the outer ring 100, thereby providing rotational force in one direction.

In this case, in the present invention, the first, second, and third multi-angle bundle pawls 310, 320, and 330 are configured to form three groups. Here, each of the three groups may be formed of a corresponding one of first, second, and third engagement tools 311, 321, and 331, in which each of the radially arranged (that is, arranged at 90° intervals) four first engagement tools 311, four second engagement tools 321, and four third engagement tools 331 forms one group.

In the present invention, the first, second, and third engaging tools 311, 321, and 331 corresponding to respective groups are configured to have protruding force by respectively inserting the springs 301 into the bundle pawl mounting grooves 220. The first, second, and third engaging tools 311, 321, and 331 have engagement tool saw teeth 312, 322, 333 respectively provided at tip portions thereof, in which each of the engagement tool saw teeth 312, 322, 333 is formed to have a straight portion and an inclined portion so as to be engaged with the outer ring saw teeth 120 of the outer ring 100.

Particularly, in the present invention, when the first, second, and third engagement tools 311, 321, and 331 respectively corresponding to the first, second, and third multi-angle bundle pawls 310, 320, 330 of the respective groups are respectively mounted in the bundle pawl mounting grooves 220, the first, second, and third engagement tools 311, 321, and 331 are respectively disposed at positions where the first, second, and third engagement tools 311, 321, and 331 intersect each other. That is, the first engagement tool 311 of the first multi-angle bundle pawl 310, the second engagement tool 321 of the second multi-angle bundle pawl 320, and the third engagement tool 331 of the third multi-angle bundle pawl 330 are continuously and repeatedly formed in one rotational direction. In this manner, the engagement tool saw teeth 312, 322, and 332 are configured to be engaged with the outer ring saw teeth 120 at sequential positions respectively having different angles.

That is, in the present invention, any one of the first, second, and third engagement tool saw teeth 312, 322, and 332 of the first, second, and third engagement tool 311, 321, and 331 of the first, second, and third multi-angle bundle pawls 310, 320, and 330 is engaged with the outer ring saw teeth 120 of the outer ring 100. For example, when the straight portions of the engagement tool saw teeth 312 of the first engagement tool 311 are respectively in contact with the straight portions of the outer ring saw teeth 120, the straight portions of the engagement tool saw teeth 322 of the second engagement tool 321 are respectively located at the ends of the inclined portions of the outer ring saw teeth 120. As a result, the engagement tool saw teeth 322 are not engaged with the outer ring saw teeth 120. In addition, the straight portions of the engagement tool saw teeth 332 of the third engagement tool 331 are respectively located at the middle portions of the inclined portions of the outer ring saw teeth 120. In this manner, segmented engagement sections of the engagement tool saw teeth 312, 322, and 332 are provided within one pitch of the outer ring saw teeth 120, thereby minimizing a gap between the saw teeth.

Meanwhile, in the embodiment of the present invention, the first, second, and third multi-angle bundle pawls 310, 320, and 330 forming a plurality of groups have been described as three groups, but the present invention is not limited thereto. The first, second, and third multi-angle bundle pawls 310, 320, and 330 may be arranged in various configurations at equal intervals.

For example, the plurality of groups may be formed of four groups of multi-angle bundle pawls, and each of the four groups may be formed of four engagement tools. Alternatively, the plurality of groups may be formed of three groups of multi-angle bundle pawls, and each of the three groups may be formed of eight engagement tools. As described above, the number of groups and the number of engagement tools are adjusted, thereby making it possible to control a degree of precision depending on the purpose of use of the impact-resistant multi-angle bundle pawl backstop ratchet ring 1 of the present invention.

Hereinafter, a detailed description will be given as to the operation of the impact-resistant multi-angle bundle pawl backstop ratchet ring of the present invention having the above-described configuration with reference to the attached drawings.

Referring to FIGS. 1 to 5, the impact-resistant multi-angle bundle pawl backstop ratchet ring 1 of the present invention may perform power transmission in one direction and may achieve structural simplification and improvement in durability to withstand strong impact loads. Further, an engagement structure for power transmission is segmented, and occurrence of backlash is maximally reduced so that possibility of backlash is close to zero, thereby enabling precise driving.

To this end, first, the outer ring 100 is connected to a separate device (not shown in the drawing) adapted to output separate power, and the shaft hole 210 formed in the inner ring 200 has a rotating shaft 10 coupled thereto, in which the rotating shaft 10 has a separate power means (not shown in the drawing) configured to provide rotational power.

Hereinafter, the operation state will be described.

First, a description will be given as to a state in which idle rotation of the inner ring 200 of the impact-resistant multi-angle bundle pawl backstop ratchet ring 1 of the present invention, that is, reverse rotation of the outer ring 100 is prevented.

Figure 7:
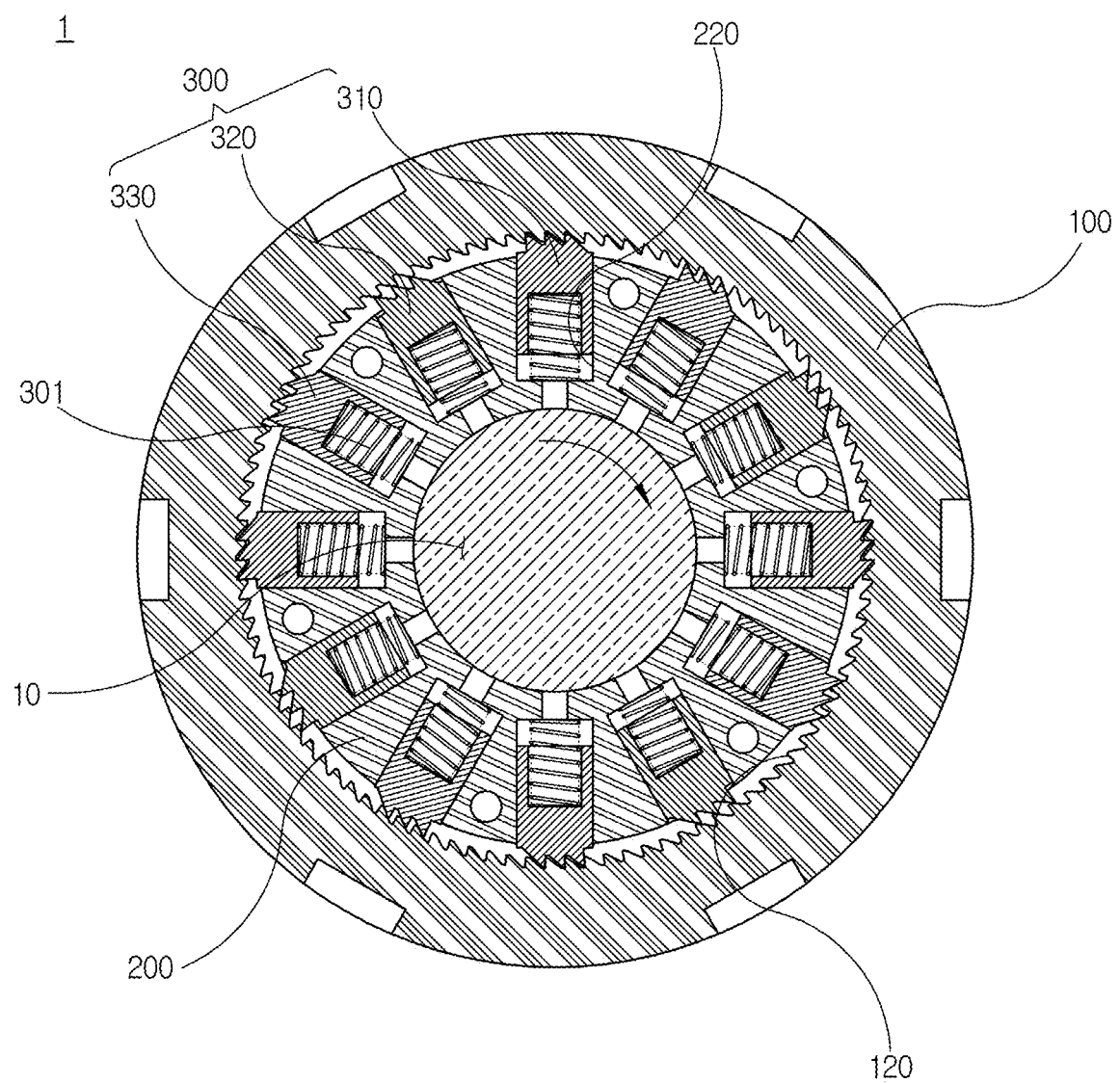
FIG. 7 is a view showing an idling operation state of the inner ring of the impact-resistant multi-angle bundle pawl backstop ratchet ring of the present invention.

Referring to FIG. 7, when rotational power is not provided to the rotating shaft 10, the inner ring 200 is freely rotatable without a power means. At this time, reverse rotation of the outer ring 100 is prevented.

Here, when the inner ring 200 is rotated in the right direction, the inclined portions of the engagement tool saw teeth 312, 322, and 332 of the first, second, and third engagement tools 311, 321, and 331 respectively forming the first, second, and third multi-angle bundle pawls 310, 320, and 330 pass over the inclined portions of the outer ring saw teeth 120 of the outer ring 100 so as to perform idle rotation, thereby preventing reverse rotation of the outer ring 100.

That is, since the springs 301 are respectively installed in the first, second, and third engagement tools 311, 321, and 331 of the inner ring 200, the engagement tool saw teeth 312, 322, and 332 that pass over the outer ring saw teeth 120 are pushed rearwards by compressive force of the springs 301, and simultaneously, the inclined portions of the outer ring saw teeth 120 and the inclined portions of the engagement tool saw teeth 312, 322, and 332 slide and move over each other.

Conversely, when the inner ring 200 is rotated in the opposite direction, that is, in the left direction, any one of the engagement tool saw teeth 312, 322, and 332 respectively formed on the first, second, and third engagement tools 311, 321, and 331 of the first, second, and third multi-angle bundle pawls 310, 320, and 330 is engaged with the outer ring saw teeth 120, thereby preventing forward rotation without providing force on the rotating shaft 10. In this case, when separate rotational power is applied to the rotating shaft 10, power may be transmitted to the outer ring 100.

Meanwhile, in the present invention, as described above, when forward rotation power is applied again during idling operation of the inner ring 200, backlash (backward movement) of the inner ring 200 is maximally reduced so that possibility of backlash is close to zero, thereby making it possible to prevent impact during power transmission.

The above-described operation may be performed by the multi-angle bundle pawl unit 300 configured to transmit rotational power of the inner ring 200 to the outer ring 100.

Figure 8:
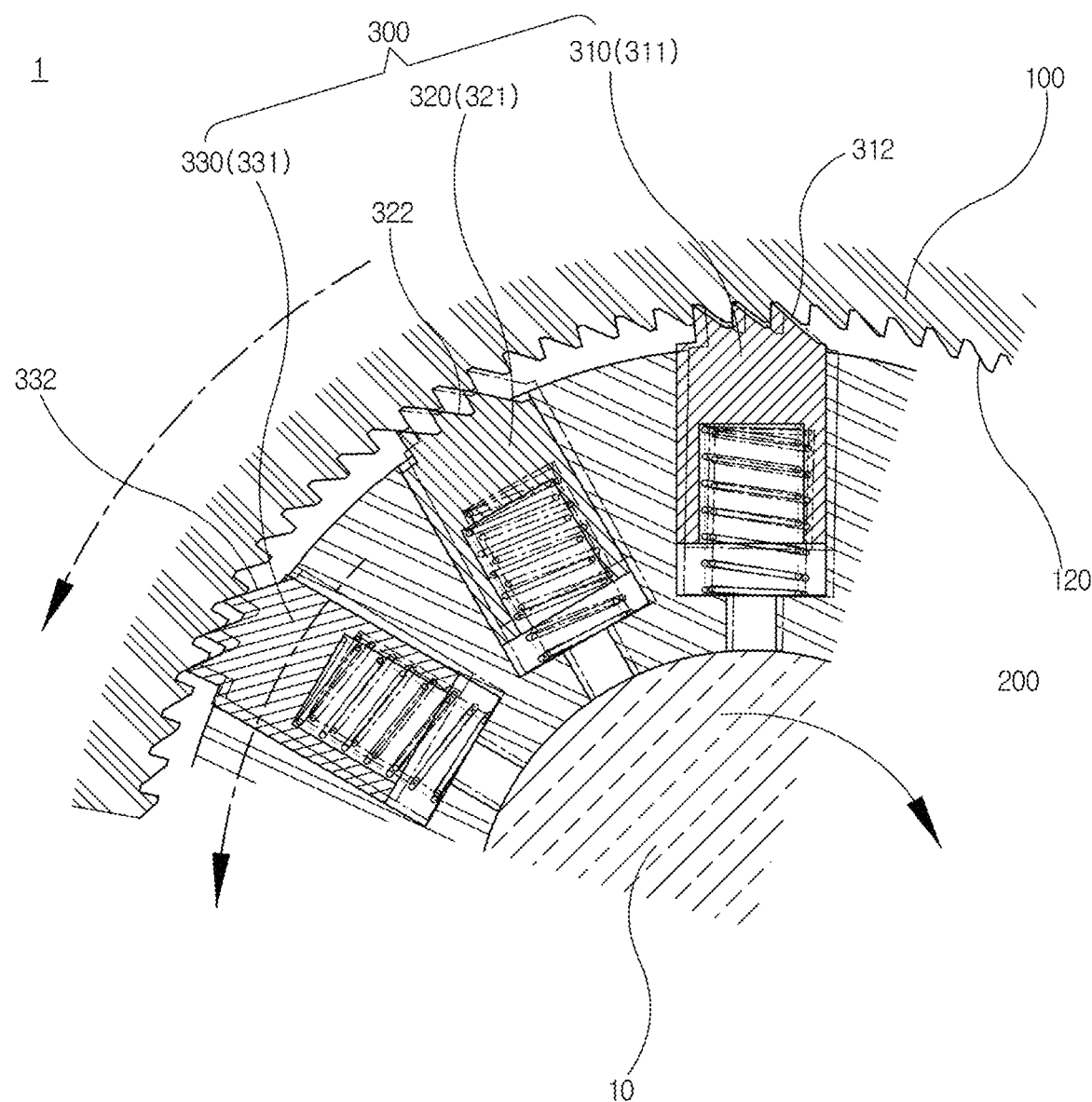
FIG. 8 is a sequential operation state of the multi-angle bundle pawl unit of the impact-resistant multi-angle bundle pawl backstop ratchet ring of the present invention.

That is, with reference to FIG. 8, in the present invention, the first, second, and third engagement tool saw teeth 312, 322, and 332 of the first, second, and third engagement tool 311, 321, and 331 of the first, second, and third multi-angle bundle pawls 310, 320, and 330 are sequentially engaged with the outer ring saw teeth 120 of the outer ring 100.

For example, when the straight portions of the engagement tool saw teeth 312 of the first engagement tool 311 are respectively in contact with the straight portions of the outer ring saw teeth 120 so as to enter the engagement state therebetween, the straight portions of the engagement tool saw teeth 322 of the second engagement tool 321 are respectively located at the ends of the inclined portions of the outer ring saw teeth 120. In this manner, the engagement tool saw teeth 322 are not engaged with the outer ring saw teeth 120. In addition, the straight portions of the engagement tool saw teeth 332 of the third engagement tool 331 are respectively located at the middle portions of the inclined portions of the outer ring saw teeth 120. Accordingly, when the inner ring 200 is rotated, the first, second, and third engagement tools 311, 321, and 331 sequentially apply engagement force to the outer ring saw teeth 120. As a result, the multi-angle bundle pawl unit 300 is constantly engaged with the outer ring saw teeth 120 in a sequential manner.

That is, in the present invention, segmented engagement sections of the engagement tool saw teeth 312, 322, and 332 are provided within one pitch of the outer ring saw teeth 120. Accordingly, in the process of idling operation of the inner ring 200, even if slight rotation occurs, engagement force is achieved at sequential positions respectively having different angles in a sequential manner. As a result, when power is transmitted, precise power transmission may be performed without backlash occurrence.

Meanwhile, referring to FIG. 6, the impact-resistant multi-angle bundle pawl backstop ratchet ring 1 of the present invention uses the rotating shaft 10 coupled to the shaft hole of the inner ring 200, thereby making it possible to perform internal and external power transmission.

The internal and external power transmission is performed by the gear portion 250 formed on the rear circumference of the inner ring 200. It is possible to perform, through engagement between the gear portion 250 and a separate power gear 20, transmission of internal and external power and rotation of the inner ring 200.

As described above, in the impact-resistant multi-angle bundle pawl backstop ratchet ring of the present invention, even if the inner ring is idling, the multi-angle bundle pawl unit is constantly engaged with the outer ring saw teeth of the outer ring in a sequential manner, thereby preventing backlash occurrence. As a result, it is possible not only to improve durability to withstand strong impact loads during driving, but also to perform precise driving.

The invention claimed is:

1. An impact-resistant multi-angle bundle pawl backstop ratchet ring comprising:
   an outer ring having an inner ring mounting hole formed to penetrate a central portion thereof, wherein the inner ring mounting hole has outer ring saw teeth formed on an inner peripheral surface thereof, wherein the outer ring saw teeth have straight portions and inclined portions continuously formed in a circumferential direction;
   a circular ring-shaped inner ring having a shaft hole formed to penetrate a central portion thereof, wherein the inner ring is mounted in the inner ring mounting hole of the outer ring and has a plurality of bundle pawl mounting grooves formed on a circumference thereof and disposed at regular intervals; and
   a multi-angle bundle pawl unit having springs each installed in a corresponding one of the bundle pawl mounting grooves, wherein the multi-angle bundle pawl unit is operated to protrude outwards by spring elasticity of the springs and is engaged with the outer ring saw teeth of the outer ring so as to provide rotational force in one direction,
   wherein the multi-angle bundle pawl unit includes plural groups of first, second, and third multi-angle bundle pawls,
   wherein the respective first, second, and third multi-angle bundle pawls are configured to be engaged with the outer ring saw teeth of the outer ring at sequential positions respectively having different angles,
   wherein the outer ring saw teeth of the outer ring are formed to protrude inwards so as to have front and rear stepped portions respectively formed at a front side of the outer ring saw teeth and a rear side thereof,
   wherein the inner ring has a seating protrusion and a finishing plate support portion, wherein the seating protrusion is formed on a rear circumference of the inner ring and is seated on the rear stepped portion of the outer ring, and the finishing plate support portion is formed to protrude from a front side of the inner ring so as to extend from the shaft hole,
   wherein the finishing plate support portion formed on the front side of the inner ring penetrates a finishing plate having a through hole formed therein, and wherein the finishing plate is seated on and coupled to the front stepped portion so as to constrain the outer ring.

2. The impact-resistant multi-angle bundle pawl backstop ratchet ring according to claim 1, wherein:
   the first, second, and third multi-angle bundle pawls are configured to form three groups, wherein each of the three groups includes a corresponding one of first, second, and third engagement tools, wherein each of the radially arranged four first engagement tools, four second engagement tools, and four third engagement tools forms one group,
   each of the first, second, and third engagement tools has a corresponding one of the springs respectively installed in the bundle pawl mounting grooves so as to have protruding force, wherein the first, second, and third engagement tools are positioned to intersect each other, and the first, second, and third engagement tools have engagement tool saw teeth respectively formed at tip portions thereof, wherein each of the engagement tool saw teeth has straight portions and inclined portions formed to be engaged with the outer ring saw teeth of the outer ring, and
   when the inner ring is rotated in one direction, the engagement tool saw teeth of the first, second, and third multi-angle bundle pawls do not interfere with the outer ring saw teeth, thereby enabling idling of the inner ring, and when the inner ring is rotated in the other direction, the engagement tool saw teeth of the first, second, and third multi-angle bundle pawls are sequentially engaged with the outer ring saw teeth, thereby enabling the outer ring and the inner ring to rotate together.

3. The impact-resistant multi-angle bundle pawl backstop ratchet ring according to claim 1, further comprising a gear portion provided on a rear circumference of the inner ring and configured to transmit external power to the inner ring.

4. The impact-resistant multi-angle bundle pawl backstop ratchet ring according to claim 1, further comprising stopping grooves formed in an outer circumference of the outer ring and arranged at regular intervals.

* * * * *